Figure 1:
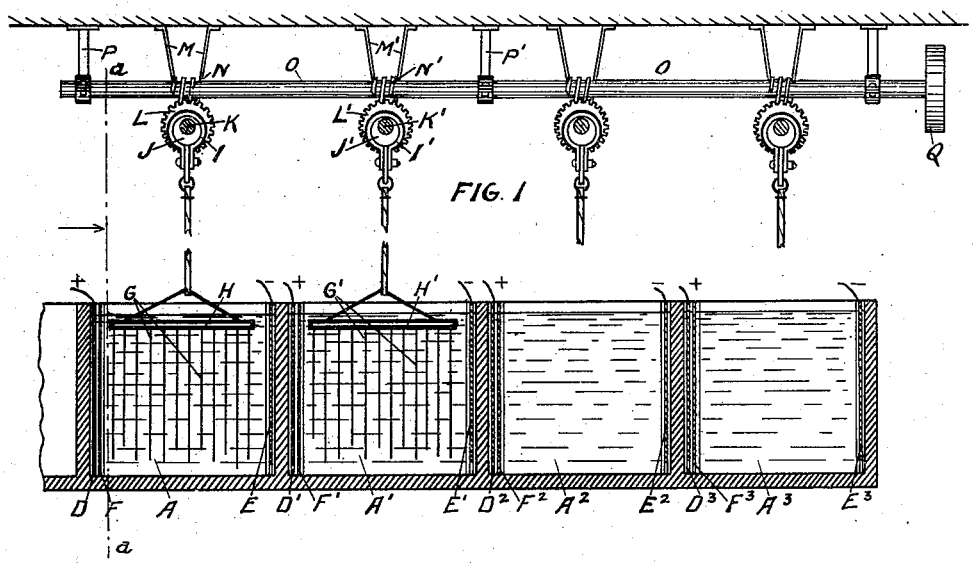

(No Model.)

E. DAVIS & H. R. MUSTARD.
PROCESS OF AND APPARATUS FOR ELECTROLYTIC TANNING.

No. 603,263. Patented May 3, 1898.

WITNESSES:
Thomas S. Gates.
J. Carlyle Ross

INVENTORS
Edward Davis and
Horace R. Mustard
By Chas. N. Butler
ATTORNEY.

UNITED STATES PATENT OFFICE.

EDWARD DAVIS, OF PHILADELPHIA, PENNSYLVANIA, AND HORACE R. MUSTARD, OF SMYRNA, DELAWARE.

PROCESS OF AND APPARATUS FOR ELECTROLYTIC TANNING.

SPECIFICATION forming part of Letters Patent No. 603,263, dated May 3, 1898.

Application filed July 27, 1896. Serial No. 600,605. (No model.)

*To all whom it may concern:*

Be it known that we, EDWARD DAVIS, residing in the city of Philadelphia, State of Pennsylvania, and HORACE R. MUSTARD, residing in the city of Smyrna, State of Delaware, citizens of the United States, have invented a new and useful Process of and Apparatus for Electrolytic Tanning, of which the following is a full, clear, and exact description.

The objects of our invention are, first, to free the water and the liquors to be used in tanning from the deleterious matters usually found therein, and, second, to advance the combination of tannic acid with the gelatin of the skins.

Water available for use in tanning generally contains a variety of impurities which are injurious to hides in process of tanning. These may be classed as suspended matter, such as mud and animal and vegetable organisms, dissolved mineral matters, such as salts of lime and magnesia, sulfates, chlorids, and bicarbonates. The injurious effects of these impurities on the hides is recognized, and it is known that they combine with and neutralize the organic acids of the tanning liquors. To clear the water of matters held in suspension, to destroy the animal and vegetable organisms, and to decompose the injurious inorganic chemical compounds held in solution, the water to be used both in washing the skins and in leaching is subjected to the action of an electric current, which has been found to purify the water and, by reduction of the chemical compounds held in solution, provide means for eliminating their deleterious effects. To act as a carrier for the current and hasten the precipitation of the deleterious substances, acetic or other vegetable acid may be used in the water, as it is not injurious to the leather, but precipitates tannin from solution and serves to fix a larger quantity of it in the leather. Water thus purified is passed through the leaches, and the liquors thus obtained, of the various degrees of density used in the process of tanning, are clarified by electrolysis, and the electric current is utilized at each stage of the process in advancing the chemical combination of the tannic acid held in solution in the liquors with the gelatin of the skins.

In subjecting the skins to the action of the tanning liquors and the current they are so placed in the handlers as to receive the current perpendicular to their surfaces, the effect of which is to greatly facilitate and also equally distribute the action of the tannin on the secreted gelatin. At the same time the skins are moved gently and continuously in a vertical plane, which effects the gentle agitation desired to bring new particles of the liquor into contact with the surfaces of the skins and prevents the deposition of deleterious matters upon the surfaces of the skins.

Our invention is illustrated in the accompanying drawings, in which—

Figure 2:
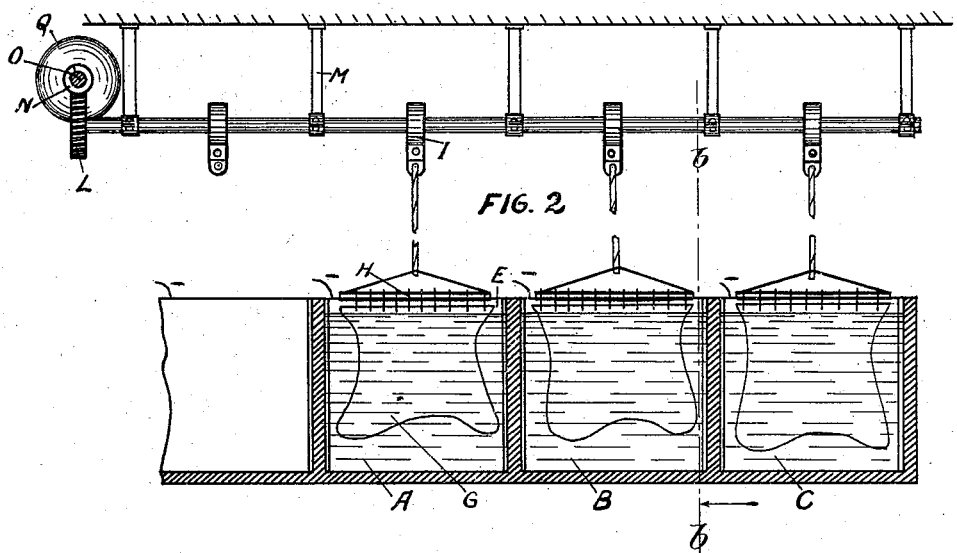
Figure 3:
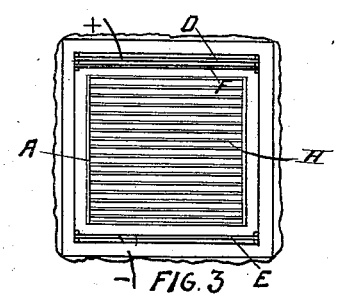

Figure 1 is a vertical section on the line $bb$ of Fig. 2 through a series of vats parallel to the direction of the current, showing the mechanism used in effecting the continuous movement of the skins. Fig. 2 is a vertical sectional view on the line $aa$ of Fig. 1, and Fig. 3 is a plan view of a vat.

The vats A A' A² A³ B C, filled, as required, with either water or liquors of the various degrees of density used in the gradual impregnation of pelts with tannin, are provided on opposite sides with suitable electrodes, which preferably extend from side to side of the vats and are connected with a suitable source of electric energy. Of these electrodes the anodes D D' D² D³ may be formed of carbon and the cathodes E E' E² E³ of copper when the direct current is used; but when it is considered desirable to use the alternating current both electrodes may be of carbon.

To catch the disintegrated particles from the anodes, and thus prevent their circulation in the tanning liquors and deposition on the surfaces of the skins, screens F F' F² F³ are placed in front of the anodes, and it will be understood that where the alternating current is used each electrode will be guarded by such screen. A woolen blanket has been found a suitable material for forming the screen.

The skins G G' are arranged in parallel and suspended vertically from the frames H H', the surfaces of the skins being placed parallel to the surfaces of the electrodes and at right angles to the direction of the current, which arrangement secures the vertical impact upon the skins of the electrolytic infusion and also distributes such action uniformly over the entire surface.

The frames H H' are connected with collars I I'. Within these collars eccentrics J J', fixed upon revoluble shafts K K', turn freely, and it is evident that if the shafts are revolved continuously and the eccentrics thus revolved the skins will be given a gentle continuous movement, which sufficiently agitates the liquor to keep new particles in constant contact with the surfaces of the skins and prevents injurious depositions without the violent agitation and undesirable movements incident to processes now in use.

The shafts K K' are journaled in hangers M M' and have fixed thereon, respectively, gear-wheels L L'. A second shaft O, journaled in hangers P P', is provided with worms N N', which are adapted to engage the respective gears L L'. As the shaft O is revolved by the pulley Q the worms N N' slowly rotate the respective gear-wheels L L', shafts K K', and eccentrics J J', which cause the collars I I' to rise and fall, and with them the frames H H' and the skins G G', which action may be continuous during the time through which the current acts, and the process of impregnating the skins with tannin is continued.

Having described our invention, we claim—

1. In the art of electrolytic tanning, the process which consists in suspending skins and effecting their continuous vertical reciprocation in a solution of tanning liquor, simultaneously passing an electric current through said solution of tanning liquor perpendicular in direction to the surfaces of said skins, and intercepting the particles precipitated at the anodes or passing therefrom by the action of a screen, as specified.

2. In the art of electrolytic tanning, a journaled shaft, a worm fixed on said shaft and adapted to revolve therewith, a second journaled shaft and a gear-wheel fixed thereon adapted to engage said worm, an eccentric fixed on said second shaft, a tanning-vat, in combination with electrodes, a frame for suspending skins therefrom within the vat, and means for connecting said frame and eccentric, as specified.

3. In the art of electrolytic tanning, the process which consists in, first, purifying water by electrolysis, then leaching with said water, then electrolyzing the tanning liquor obtained from leaching, then suspending the skins to be tanned in said tanning liquor and subjecting them to the action of an electric current, as specified.

4. The combination of a tanning-vat, electrodes so arranged as to pass an electric current across the vat from electrode to electrode when the vat is supplied with tanning liquor and means for vertically suspending and vertically reciprocating the skins between the electrodes with the sides of the skins opposed to the direction of the electric current, as and for the purpose set forth.

EDWARD DAVIS.
HORACE R. MUSTARD.

Witnesses:
CHARLES N. BUTLER,
JOHN MUSTARD,
R. G. WALLEN.